United States Patent [19]

Sekmakas

[11] 4,083,892
[45] Apr. 11, 1978

[54] HIGH SOLIDS COATING COMPOSITIONS CONTAINING TETRAHYDRIC ADDUCT

[75] Inventor: Kazys Sekmakas, Chicago, Ill.

[73] Assignee: DeSoto, Inc., Des Plaines, Ill.

[21] Appl. No.: 698,859

[22] Filed: Jun. 23, 1976

[51] Int. Cl.$^2$ .................. C08L 61/28; C08L 61/24
[52] U.S. Cl. .................. 260/855; 260/33.2 R;
260/851; 260/856
[58] Field of Search .................. 260/851, 855, 856

[56] References Cited
U.S. PATENT DOCUMENTS

| | | | |
|---|---|---|---|
| 3,267,174 | 8/1966 | Fry et al. | 260/851 |
| 3,352,806 | 11/1967 | Hicks | 260/851 |
| 3,959,201 | 5/1976 | Chang | 260/850 |
| 3,959,202 | 5/1976 | Blank | 260/851 |

Primary Examiner—John C. Bleutge

Attorney, Agent, or Firm—Dressler, Goldsmith, Clement, Gordon & Shore, Ltd.

[57] ABSTRACT

Essentially solvent-free resinous coating compositions are provided which are sufficiently fluid to permit effective application, and which cure on baking at low temperature to provide hard stain- and detergent-resistant coatings. These are made by copolymerizing monoethylenic monomers including monoethylenic monomer having a functional group reactive with N-methylol functionality and selected from carboxylic acid, hydroxy and amide groups, the copolymerization being carried out in a solvent medium consisting essentially of tetrahydric adduct of propylene oxide with pentaerythritol having a molecular weight of at least about 400. The copolymer solution has added thereto an aminoplast resin to provide a stable solution in which proportions are important so that coatings can be easily applied and cured to provide the desired characteristics without liberating large amounts of volatile material.

12 Claims, No Drawings

HIGH SOLIDS COATING COMPOSITIONS CONTAINING TETRAHYDRIC ADDUCT

The present invention relates to essentially solvent-free resinous coating compositions which are sufficiently fluid to permit effective application and which cure on baking at relatively low temperature to provide hard, flexible, adherent, and chemically resistant coatings. Coatings which cure to provide excellent stain and detergent resistance are particularly contemplated to provide coatings suited for use as appliance finishes. Container coatings and construction coatings are also comtemplated.

The present trend in coating technology is to minimize the proportion of volatile organic solvent in the liquid coating composition which is applied, and one way to do this is to provide the needed fluidity using a high boiling reactive liquid which combines chemically with the more resinous components in order to become a permanent component of the final cured film. To this end, efforts have been made to use dihydric or trihydric alcohols as the reactive liquids for the cure of reactive copolymers, but good stain resistance and good detergent resistance has not been attainable in this fashion. These efforts are illustrated by U.S. Pat. Nos. 3,267,174, 3,352,806, and 3,920,595.

In this invention, coatings of high solids content are obtained which cure to form hard impact-resistant films by combining a reactive copolymer with an aminoplast resin and a liquid tetrahydric adduct of propylene oxide with pentaerythritol.

In the reactive copolymer, monoethylenic monomers including from about 5% to 20% by weight of monoethylenic monomer having a functional group reactive with N-methylol functionality and selected from carboxylic acid, hydroxy and amide groups, are copolymerized in an organic solvent medium consisting essentially of the tetrahydric adduct. This tetrahydric adduct is a polyether formed by reacting a stoichiometric excess of propylene oxide with pentaerythritol to provide a molecular weight of about 400 or higher consistent with the maintenance of a liquid product. The preferred products have low viscosity, so a molecular weight in the range of 500 to 1,000 is preferred.

Aminoplast resin is incorporated in the solution, and this provides a liquid coating composition which is essentially solvent free and which is sufficiently fluid to permit easy coating application at room or slightly elevated temperature.

Proportions are important to the preferred practice of this invention, and this requires a relatively small proportion of reactive copolymer and a relatively large proportion of tetrahydric adduct. More particularly, the reactive copolymers should constitute from about 15%-85% of the weight of the tetrahydric adduct. Continuing with the proportions which should be used, the reactive copolymer should constitute from about 4.5% to 30% of the mixture, the tetrahydric adduct should constitute from about 30% to 60% of the mixture, and the balance of the mixture of the three components will consist essentially of aminoplast resin. It is also preferred to use at least about 0.8 part of aminoplast per part of reactive copolymer, preferably at least 1.5 parts per part of reactive copolymer.

Preferred proportions are 8% to 25% of reactive copolymer combined with 32% to 50% of the tetrahydric adduct, and 25% to 60% of the aminoplast resin, there being at least 2 parts of tetrahydric adduct per part of reactive copolymer.

In this description, and also in the claims, all parts and proportions are by weight unless otherwise noted.

The reactive copolymer and the tetrahydric adduct are both co-reactive with the N-methylol groups of the aminoplast resin, and cures take place at temperatures of about 250° and higher. Since there is little or no volatile component, there are no large amounts of volatiles to be liberated during cure, and this avoids undesirable pollution of the atmosphere, and it also reudces cost and hazard.

The non-reactive monoethylenic monomers which are combined with the reactive monomer in the reactive copolymer are subject to wide variation. Normally, monomers which provide hard homopolymers are relied upon to provide at least about 15% of the copolymer, these being especially illustrated by styrene and vinyl toluene, styrene being particularly preferred to maximize hardness and water resistance. Other hardening monomers less desirably present are methyl methacrylate, acrylonitrile, and vinyl acetate. Monomers providing soft homopolymers are also desirably included in amounts of at least about 40% of the copolymer. These are illustrated by ethyl acrylate, n-butyl acrylate, isobutyl acrylate, 2-ethylhexyl acrylate and similar alkyl esters of monoethylenic carboxylic acids. Isobutyl acrylate in an amount of from about 45%-70% is particularly preferred. The specific nature of the monoethylenic monomers constituting the balance of the acid copolymer is of secondary significance to this invention. In preferred practice, the nonreactive monoethylenic monomers contain the single ethylenic group as the sole functional group thereof, and constitute at least about 75% of the copolymer and, more preferably, the entire balance of the copolymer, except for the reactive monomer.

The reactive monomers may be of several types which may be used alone or in admixture with one another. Monoethylenic carboxylic acid monomers are preferred, but other reactive monoethylenic monomers may be used such as amide monomers, for example, acrylamide or methacrylamide, or a hydroxy functional monomer such as hydroxy ethyl acrylate or methacrylate. Hydroxy- or carboxy-functional polyesters may also be included in small amount as taught in my prior U.S. Pat. No. 3,163,615.

The preferred carboxylic monomers are illustrated by acrylic acid, methacrylic acid, crotonic acid, monobutyl fumarate, and the like. The reactive monomers will include the reactive groups noted, but no other reactive group.

The aminoplast resins constitute a conventional class of heat hardening condensates of polyamines with formaldehyde, and ethers thereof. Urea-formaldehyde, melamine-formaldehyde, and benzoguanamine-formaldehyde resins will illustrate this class of materials. Since fluidity at room temperature is a feature of the invention, liquid methyl ethers are preferred, such as hexamethoxy methyl melamine.

The tetrahydric adducts uniquely useful herein are polyethers formed by adducting propylene oxide with pentaerythritol, the propylene oxide being used in stoichiometric excess to form a polyether of desired molecular weight in accordance with the invention.

While minor amounts of dihydric or tetrahydric alcohols may be present in admixture with the tetrahydric adduct, these dihydric or trihydric alcohols are preferably absent because these lead to reduced stain in resistance and reduced detergent resistance.

While volatile organic solvents are preferably completely absent, small amounts thereof may be present to reduce viscosity, but these would normally be added to the final product so that whatever final viscosity is desired can be obtained at the time of application. This small amount of solvent would evaporate during the cure and would therefore provide some limited pollution which it is desired to avoid. Nonetheless, up to about 20% of volatile organic solvent may be present for viscosity adjustment, though in the preferred practice of this invention, the volatile organic solvent content would be less than about 10%, most preferably less than 5%. The most preferred products contain less than 1% of volatile solvent.

The copolymerization is carried out by heating the mixture of monomers and tetrahydric adduct in the presence of a free radical generating catalyst, such as a peroxide or equivalent catalyst, for example, azobisisobutyronitrile. Suitable temperatures for copolymerization may vary from 60°–200° C., preferably from 80°–150° C.

The invention is illustrated in the following examples.

EXAMPLE 1

Example 1

| Preparation of High Solids Coating Solution | |
|---|---|
| 1260 | Tetrahydric adduct of propylene oxide and pentaerythritol having an average molecular weight of 550. Charge to reactor, set reflux consder, and heat to 125° C. with agitation. |
| 190 | Styrene |
| 380 | Isobutyl acrylate |
| 60 | Acrylic acid |
| 15 | Benzoyl peroxide |
| 12 | Tertiary dodecyl mercaptan Premix monomers, catalyst and chain terminator, and add to reactor over 3 hours at 125° C. Hold for one hour. |
| 5 | Tertiary butyl perbenzoate Add catalyst, Hold for two hours. Cool to 70° C. |
| 1050 | Aminoplast resin (Resimene 745 - Monsanto - see note 1) Add aminoplast resin slowly at 70° C. and then cool to 30° C. to provide a mixture having the following final characteristics: |
| | Solids 100% |
| | Viscosity (Gardner) $Z_4 - Z_5$ |
| | Color (Gardner-Holdt) 1 |
| | Acid Value 18.6 |

Note 1 - hexamethoxy methyl melamine

I claim:

1. A fluid resinous coating composition containing less than about 20% of volatile organic solvent and which cures on baking, said coating composition consisting essentially of a mixture of:
   (1) a copolymer of monoethylenic monomers including from about 5–20% of monoethylenic monomer having a functional group reactive with the N-methylol group and selected from carboxylic acid, hydroxy, and amide groups, said copolymer being produced by copolymerization in an organic solvent medium consisting essentially of component (2) below;
   (2) liquid tetrahydric adduct of propylene oxide with pentaerythritol having a molecular weight of at least about 400, said copolymer being dissolved in said tetrahydric adduct; and
   (3) an aminoplast resin; said copolymer constituting from about 4.5% to 30% of the mixture, the tetrahydric adduct constituting from about 30%–60% of the mixture, and the balance of the mixture of the three components consisting essentially of aminoplast resin, there being at least about 0.8 parts of aminoplast resin per part of copolymer, and said copolymer being present in an amount of from about 15%–80% of the weight of the tetrahydric adduct.

2. A coating composition as recited in claim 1 in which the copolymer is present in an amount of 8%–25%, the tetrahydric adduct is present in an amount of from 32%–50%, and the aminoplast resin is present in an amount of from 25%–60%, there being at least 2 parts of tetrahydric adduct per part of copolymer.

3. A coating composition as recited in claim 1 in which at least about 15% of the copolymer is constituted by styrene or vinyl toluene.

4. A coating composition as recited in claim 1 in which at least about 75% of the copolymer is constituted by nonreactive monoethylenic monomers containing the single ethylenic group as the sole functional group thereof.

5. A coating composition as recited in claim 1 in which at least about 40% of the copolymer is selected from styrene, vinyl toluene, methyl methacrylate, acrylonitrile and vinyl acetate, and the balance of the copolymer, except for the reactive monomer, consists essentially of alkyl esters of monoethylenic carboxylic acid.

6. A coating composition as recited in claim 5 in which said copolymer includes from about 45%–70% of isobutyl acrylate.

7. A coating composition as recited in claim 1 in which said aminoplast resin is present in the form of a liquid methyl ether.

8. A coating composition as recited in claim 7 in which said aminoplast resin is hexamethoxymethyl melamine.

9. A coating composition as recited in claim 1 in which said tetrahydric adduct is a polyether having a molecular weight in the range of 500 to 1,000.

10. A coating composition as recited in claim 1 containing less than 5% of volatile organic solvent.

11. A coating composition as recited in claim 1 containing less than 1% of volatile organic solvent.

12. A coating composition as recited in claim 1 in which said reactive monomer consists of monoethylenic carboxylic acid.

* * * * *